United States Patent
Monson

(10) Patent No.: US 8,201,696 B2
(45) Date of Patent: Jun. 19, 2012

(54) APPARATUS AND METHODS FOR SEPARATING A HYDROCARBON

(75) Inventor: John J. Monson, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 393 days.

(21) Appl. No.: 12/557,174

(22) Filed: Sep. 10, 2009

(65) Prior Publication Data

US 2010/0096321 A1    Apr. 22, 2010

Related U.S. Application Data

(60) Provisional application No. 61/106,820, filed on Oct. 20, 2008.

(51) Int. Cl.
*B01D 11/00* (2006.01)

(52) U.S. Cl. ....... 210/511; 96/274; 196/14.52; 202/158; 422/256

(58) Field of Classification Search ........... 210/266, 210/511, 634; 422/256, 257; 202/158, 152, 202/270; 203/91; 196/14.52; 261/94, 95, 261/100, 101; 96/243, 267, 274, 290, 296, 96/299, 300
See application file for complete search history.

(56) References Cited

U.S. PATENT DOCUMENTS

| | | | |
|---|---|---|---|
| 1,782,735 A | 11/1930 | MacKenzie | |
| 2,150,491 A | 3/1939 | Cope | |
| 2,791,537 A * | 5/1957 | Felix et al. | 196/14.52 |
| 2,850,362 A * | 9/1958 | Scheibel | 422/259 |
| 4,028,191 A * | 6/1977 | Scott | 202/158 |
| 4,039,389 A | 8/1977 | Christman | |
| 4,104,041 A * | 8/1978 | Arita et al. | 95/213 |
| 4,208,284 A * | 6/1980 | Pretorius et al. | 210/767 |
| 4,336,106 A | 6/1982 | Winter | |
| 4,686,089 A | 8/1987 | Haberland | |
| 4,954,260 A * | 9/1990 | Ludmer et al. | 210/634 |
| 5,236,663 A * | 8/1993 | Alagy et al. | 422/211 |
| 5,738,762 A * | 4/1998 | Ohsol | 203/11 |

FOREIGN PATENT DOCUMENTS

| | | |
|---|---|---|
| FR | 2 260 369 | 9/1975 |
| GB | 2 097 282 | 11/1982 |

OTHER PUBLICATIONS

European Search Report (R. 64 EPC), dated Jul. 29, 2009.

* cited by examiner

*Primary Examiner* — Joseph Drodge
(74) *Attorney, Agent, or Firm* — Andrew B. Griffis

(57) ABSTRACT

Apparatus and methods for liquid-liquid extraction. The apparatus can include a housing having a first section, second section, and third section. One or more sieve trays can be disposed in the first section, and one or more gratings can be disposed in the second section. A hydrocarbon feed inlet can be disposed adjacent the second section, wherein each grating has a plurality of openings formed therethrough. The openings having at least three sides. The first section can be disposed at a first end of the second section, and the third section can disposed at a second end of the second section.

3 Claims, 3 Drawing Sheets

APPARATUS AND METHODS FOR SEPARATING A HYDROCARBON

CROSS-REFERENCE TO RELATED APPLICATIONS

This application claims priority from U.S. Provisional Application Ser. No. 61/106,820, filed Oct. 20, 2008, the contents of which are incorporated by reference in their entirety.

FIELD OF THE INVENTION

Embodiments of the present invention generally relate to hydrocarbon separation. More particularly, embodiments relate to liquid-liquid extraction to separate aromatic hydrocarbons from non-aromatic hydrocarbons.

BACKGROUND OF THE INVENTION

Aromatic hydrocarbons, such as benzene, toluene and xylenes ("BTX"), serve as important building blocks for a variety of plastics, foams and fibers. Traditionally, these compounds have been produced via catalytic reformation of naphtha or through steam cracking of naphtha or gas oils, producing streams such as reformate and pyrolysis gasoline. BTX derived from such traditional methods typically include substantial amounts of non-aromatic compounds having similar boiling points. As such, simple distillation or fractionation is not a cost effective or practical method for separation.

Accordingly, liquid-liquid extraction techniques have been used. Such extraction techniques typically use a solvent which exhibits a higher affinity for the aromatic compounds to selectively extract the aromatic compounds from the mixture of aromatics and non-aromatics. For example, one widely used solvent extraction technique is the sulfolane process developed by Shell Oil Company. The process uses a combination of liquid-liquid extraction and extractive distillation in a single, integrated design, and employs tetrahydrothiophene-1,1-dioxide (or sulfolane) as a solvent and water as a co-solvent. In practice, however, the design suffers in that light impurities have a tendency to buildup in the extractive distillation tower and recycle system. This is due to sieve tray fouling or high unit rates, both reducing disengaging times. These undesired effects result in the incapacity of the extractor to efficiently remove and recover the aromatic compounds within the mixed feedstock.

The typical response to correcting the incapacity of the extractor is to move the recycle location, add more stages of sieve trays during a down time, reduce operating rates, or shutdown and clean/replace the sieve tray decks.

There is a need, therefore, for more effective and efficient apparatus and methods for the separation of aromatic hydrocarbons and non-aromatic hydrocarbons.

SUMMARY OF THE INVENTION

Apparatus and methods for liquid-liquid extraction are provided. In at least one specific embodiment, the apparatus can include a housing having a first section, second section, and third section. One or more sieve trays can be disposed in the first section, and one or more gratings can be disposed in the second section. A hydrocarbon feed inlet can be disposed adjacent the second section, wherein each grating has a plurality of openings formed therethrough, each opening having at least three sides; the first section can be disposed at a first end of the second section, and the third section can disposed at a second end of the second section.

In at least one other specific embodiment, the apparatus can include a housing having a first section, second section, and third section, where one or more sieve trays can be disposed in the first section; one or more gratings can be disposed in the second section; and one or more wire mesh screens can be disposed in the third section. Each grating comprises a plurality of openings formed therethrough. The second section is in fluid communication with a hydrocarbon feed inlet to the housing. The first section is disposed at a first end of the second section, and the third section is disposed at a second end of the second section.

In at least one specific embodiment, the method comprises feeding one or more solvents and a hydrocarbon mixture comprising one or more aromatic compounds and one or more non-aromatic compounds to an extractor. The extractor comprises a housing having a first section, second section, and third section; one or more sieve trays disposed in the first section; one or more gratings disposed in the second section; and one or more packing materials disposed in the third section. Each grating comprises a plurality of openings having at least three sides formed therethrough. The second section is in fluid communication with a hydrocarbon feed inlet to the housing. The first section is disposed at a first end of the second section; and the third section is disposed at a second end of the second section. A raffinate comprising a majority of the non-aromatics can be recovered from the first section, and a rich solvent comprising a majority of the aromatics can be recovered from the third section.

BRIEF DESCRIPTION OF THE DRAWINGS

So that the recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
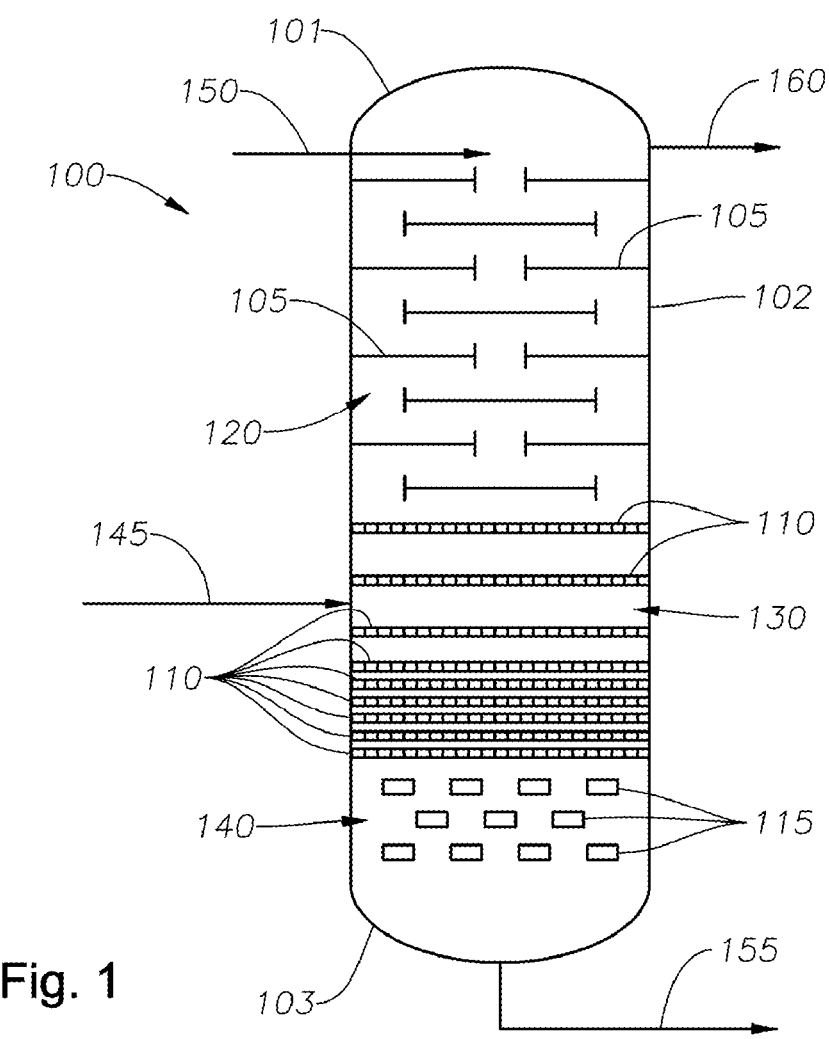
FIG. 1 depicts a partial cross sectional view of an illustrative, improved extractor design for separating a hydrocarbon mixture, according to one or more embodiments described.

FIG. 1 depicts a partial cross sectional view of an illustrative extractor 100 for separating a hydrocarbon mixture, according to one or more embodiments. The extractor or extractor 100 can include a shell or housing 102 disposed at any angle, in any configuration, and/or having any length to diameter (L/D) ratio. For clarity and ease of description, the extractor 100 will further be described with reference to a vertical, cylindrical vessel having an L/D ratio of greater than 1.

In one or more embodiments, the housing 102 defines two or more sections or volumes therein. For example, three sections are depicted in FIG. 1, namely a first section ("aromatics recovery section") 120, a second section ("feed section") 130, and a third section ("aromatics purity section") 140. The first section 120 can be disposed at a first end 101 of the extractor 100 and the third section 140 can be disposed at a second end 103 of the extractor 100. The second section 130 is disposed between the first section 120 and the third section 140, each section in fluid communication with one another. As discussed in more detail below, a solvent inlet 150 and raffinate outlet 160 are in fluid communication with the first section 120.

The first section 120 can include one or more trays 105 disposed therein. Illustrative trays can include, but are not limited to sieve trays, rotating discs, perforated trays, bubble cap trays, floating valve trays, fixed valve trays, tunnel trays, cartridge trays, dual flow trays, baffle trays, shower deck trays, disc and donut trays, orbit trays, horse shoe trays, cartridge trays, snap-in valve trays, chimney trays, slit trays, shed trays, or any combination thereof.

In at least one specific embodiment, the one or more trays 105 are sieve trays containing a plurality of circular openings or flowpaths formed therethrough. Each opening can have a diameter ranging from a low of about 3 mm, about 4 mm, about 5 mm, about 6 mm, about 7 mm, or about 8 mm to a high of about 9 mm, about 10 mm, about 11, about 12, about 13, about 14, about 15, about 16, about 17, about 18, about 19, about 20, about 21, about 22, about 23, about 24, or about 25 mm.

The first section 120 can also include one or more packing materials (not shown) disposed therein. As used herein, the term "packing material" can include, but is not limited one or more types of structured and/or random shaped materials. The packing material can increase the effective surface area within the extractor 100, increasing the mass transfer between liquid and gas phases. Suitable packing materials can include one or more metals, metal alloys, ceramics, composites or other non-metals, polymers, glass, or any combination thereof.

In one or more embodiments, suitable packing materials can be or include one or more Raschig rings, Lessing rings, I-rings, saddle rings, Intalox saddles, Tellerettes, Pall rings, U-rings, or any combination thereof. Illustrative examples of commercially available structured packing includes, but are not limited to, Flexipac® and Gempak® structured packings as manufactured by the Koch-Glitsch Corporation, corrugated sheets, crimped sheets, gauzes, grids, wire mesh, monolith honeycomb structures, or any combination thereof.

The third section 140 is disposed below the second section 130. The third section 140 is in fluid communication with one or more rich solvent outlets 155. The third section 140 can include one or more vortex breakers (not shown), packing materials (not shown), and or demister pads 115 disposed therein. The demister pads 115 can be or include one or more crinkled wire mesh screens ("CWMS"). Suitable CWMS can be made from a plurality of inter-twined strips of wire. The interwoven or inter-twined strips of wire can be made of the same materials, such as steel, stainless steel, nickel, or alloys thereof, or made from multiple types of materials. In one or more embodiments, the wire may be coated with a non-polar material such as Teflon™, epoxide resin, or other comparable, non-polar materials. In at least one specific embodiment, the wire mesh can be made from a monofilament of Teflon™ woven with a monofilament of stainless steel.

Each pad 115 can have the same dimensions or the dimensions of each pad 115 can be different and independent of one another. In one or more embodiments, each pad 115 can range in length from about 0.5 m, 1.0 m, or 3 m to about 5 m, 10 m, or 15 m. Each pad 115 can range in width from about 0.1 m, 0.5 m, or 1 m to about 1.5 m, 2 m, or 5 m. Each pad 115 can range in height from about 0.1 m, 0.5 m, or 1 m to about 1.5 m, 2 m, or 5 m.

Still referring to FIG. 1, the second section 130 is located between the first section 120 and the third section 140. The second section 130 is in fluid communication with one or more hydrocarbon feed inlets 145. In one or more embodiments, the second section 130 is devoid of any sieve trays or packing material. Instead, the second section 130 can include one or more feed grids or gratings 110 to provide a better coalescing surface area for separation and additional open area to mitigate fouling. In one or more embodiments, the second section 130 can include a single grate 110. In one or more embodiments, the second section 130 can include two or more gratings 110, three or more gratings 110, four or more gratings 110, five or more gratings 110, six or more gratings 110, seven or more gratings 110, eight or more gratings 110, ten or more gratings 110, twenty or more gratings 110, thirty or more gratings 110, or fifty or more gratings 110, depending on design criteria, feed specifications, and product specifications. When two or more gratings 110 are used, the vertical spacing between the gratings 110 can also vary, depending on design criteria, feed specifications, and product specifications. For example, each vertical spacing between any two gratings 110 can vary from about 0.25 m to about 10 m; preferably from about 0.25 m to about 5 m; and more preferably from about 0.25 m to about 0.5 m.

Figure 2:
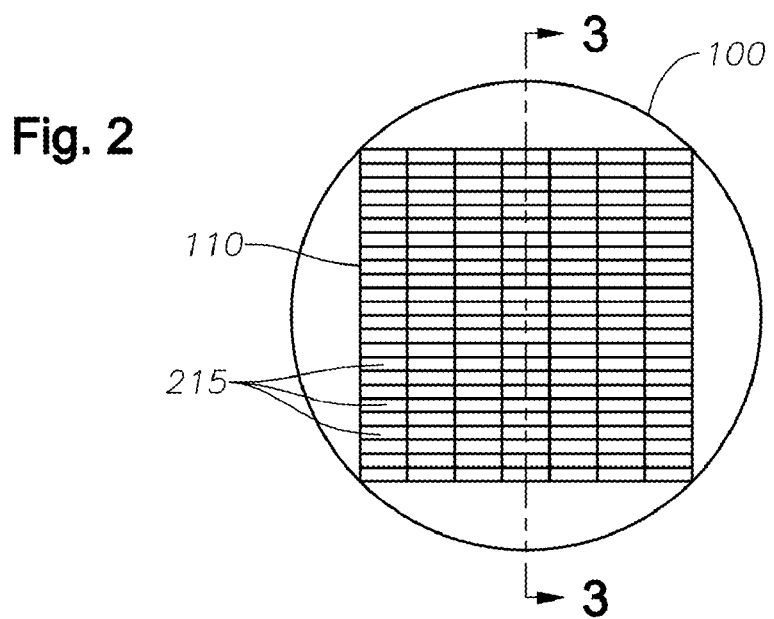
FIG. 2 depicts a plan view of an illustrative feed grating, according to one or more embodiments described.

FIG. 2 depicts a plan view of an illustrative feed grate or grating 110, according to one or more embodiments. The feed grating 110 can be a monolithic structure containing a plurality of openings or passageways 215 formed therethrough. In one or more embodiments, each grating 110 has at least 50% open area. In one or more embodiments, each grating 110 has at least 75% open area. In one or more embodiments, each grating 110 has at least 90% open area.

Each opening 215 can be triangular, square, rectangular, hexagonal, elliptical, circular, oval, or any other shape. In at least one specific embodiment, each opening 215 has a polygonal cross-section having at least three sides. In at least one specific embodiment, each opening 215 is triangular, square, rectangular, or hexagonal, preferably rectangular as depicted in FIG. 2, to provide a grid pattern resembling that of pedestrian grating or subway grating.

In one or more embodiments, the length and/or width of each opening 215 can range from a low of about 0.5 cm, about 1 cm, about 1.5 cm, or about 2 cm to a high of about 3 cm, about 5 cm, about 7 cm, or about 10 cm. In one or more embodiments, the height of each opening 215 can range from a low of about 0.5 cm, about 1.0 cm, or about 1.5 cm, to a high of about 2 cm, about 3 cm, about 5 cm, or about 10 cm.

In one or more embodiments, the cross-section area of each opening 215 can be the same or different. For example, the openings 215 disposed about the periphery of the feed grating 110 can be smaller or larger than the openings 215 of the feed grating 110 disposed about a central portion of the feed grating 110. Similarly, different sized openings 215 can be randomly distributed or arranged in a certain pattern, such as a circular, spiral, or square shaped pattern, across the grating 110.

Figure 3:
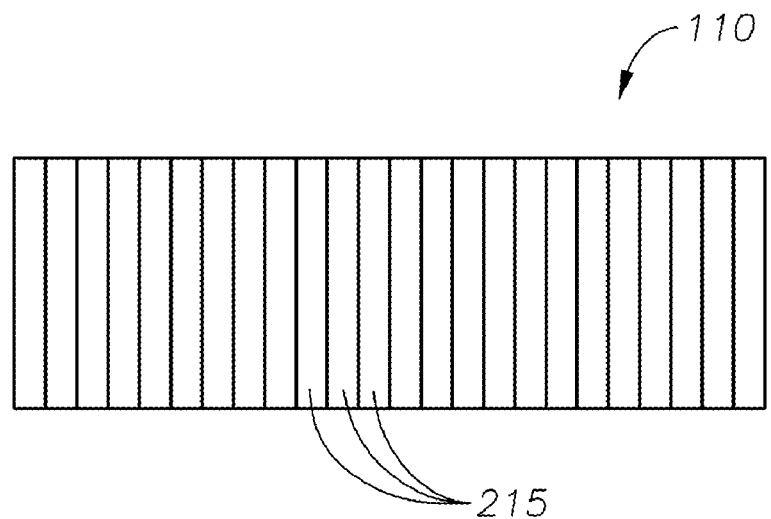
FIG. 3 depicts a cross sectional view of the illustrative feed grating depicted in FIG. 2 along lines 3-3.
Figure 4:
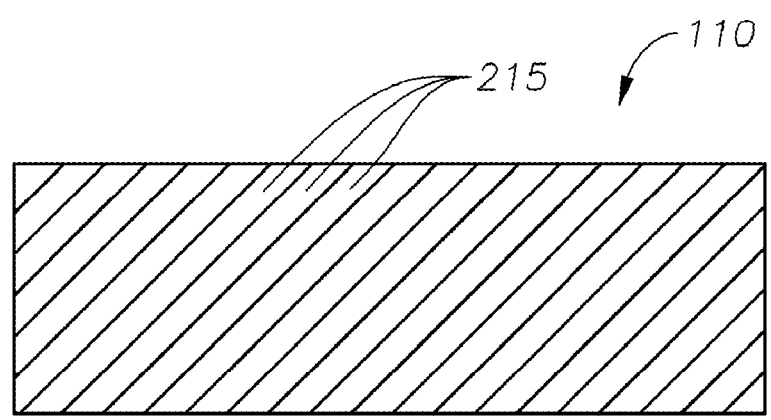
FIG. 4 depicts a cross sectional view of another illustrative feed grating, according to one or more embodiments described.

FIG. 3 depicts a cross sectional view of the feed grating 110 depicted in FIG. 2 along lines 3-3. As shown, each opening 215 can be parallel with respect to the longitudinal axis of the extractor 100. However, each opening 215 can be angled or pitched with respect to the longitudinal axis of the extractor 100, as depicted in FIG. 4. As shown in FIG. 4, the openings 215 can be oriented in a non-perpendicular or pitched orientation with respect to the longitudinal axis of the extractor 100. For example, each opening 215 can be oriented at an angle ranging from a low of about 10°, about 20°, or about 30° to a high of about 40°, about 75°, or about 90° relative to the longitudinal axis of the column 130. In one or more embodiments, each opening 215 can be oriented at an angle of about 35°, about 45°, or about 55° relative to the longitudinal axis of the extractor 100.

Referring again to FIG. 1, the one or more feed gratings 110 can span the entire cross section of the second section 130 of the extractor 100 or only part thereof. In one or more embodiments, the cross sectional area of each feed grating 110 can be the same or different. Each feed grating 110 can span about 40%, about 50%, about 60%, about 70%, about 80%, about 90%, or about 100% of the cross sectional area of the second section 130. In one or more embodiments, each feed grating 110 can span 10% to 99%; 20% to 90%; 30% to 80%; 40% to 75%; 50% to 90%; or 60% to 90% of the cross sectional area of the second section 130.

Figure 5:
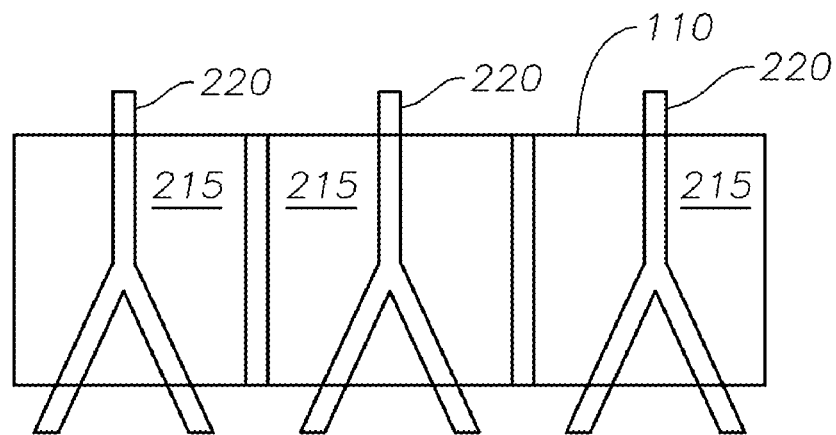
FIG. 5 depicts a partial side view of an illustrative feed grating with a strip of coated material, according to one or more embodiments described.

In one or more embodiments, each feed grating 110 can be at least partially coated. The one or more feed gratings 110 can be at least partially coated with one or more non-polar materials to provide additional coalescing contact area. The non-polar coating can attract or otherwise have an affinity for the non-aromatic hydrocarbons, also non-polar, which can further promote the separation of the aromatic hydrocarbons from the non-aromatic hydrocarbons. The one or more non-polar coatings should also be compatible with aromatic hydrocarbons. Suitable coating materials can include, for example, fluoropolymers, such as Teflon™, and epoxy-containing polymers. In one or more embodiments, one or more non-polar strips 220 can be clipped or otherwise attached to or through one or more openings 215 of any one or more feed gratings 110, as depicted in FIG. 5.

The housing 102 and the components contained therein, including the one or more trays 105, one or more feed gratings 110, and one or more demister pads 115 can be made from any suitable material. Suitable materials can include, but are not limited to, one or more metallic and/or non-metallic materials physically and chemically compatible with the temperature, pressure, and contents of the extractor 100. Suitable metallic materials can include, but are not limited to, ferrous alloys including carbon and stainless steels, and non-ferrous alloys such as aluminum, nickel, Hastelloy, Inconel, incalloy, tantalum, and the like.

Figure 6:
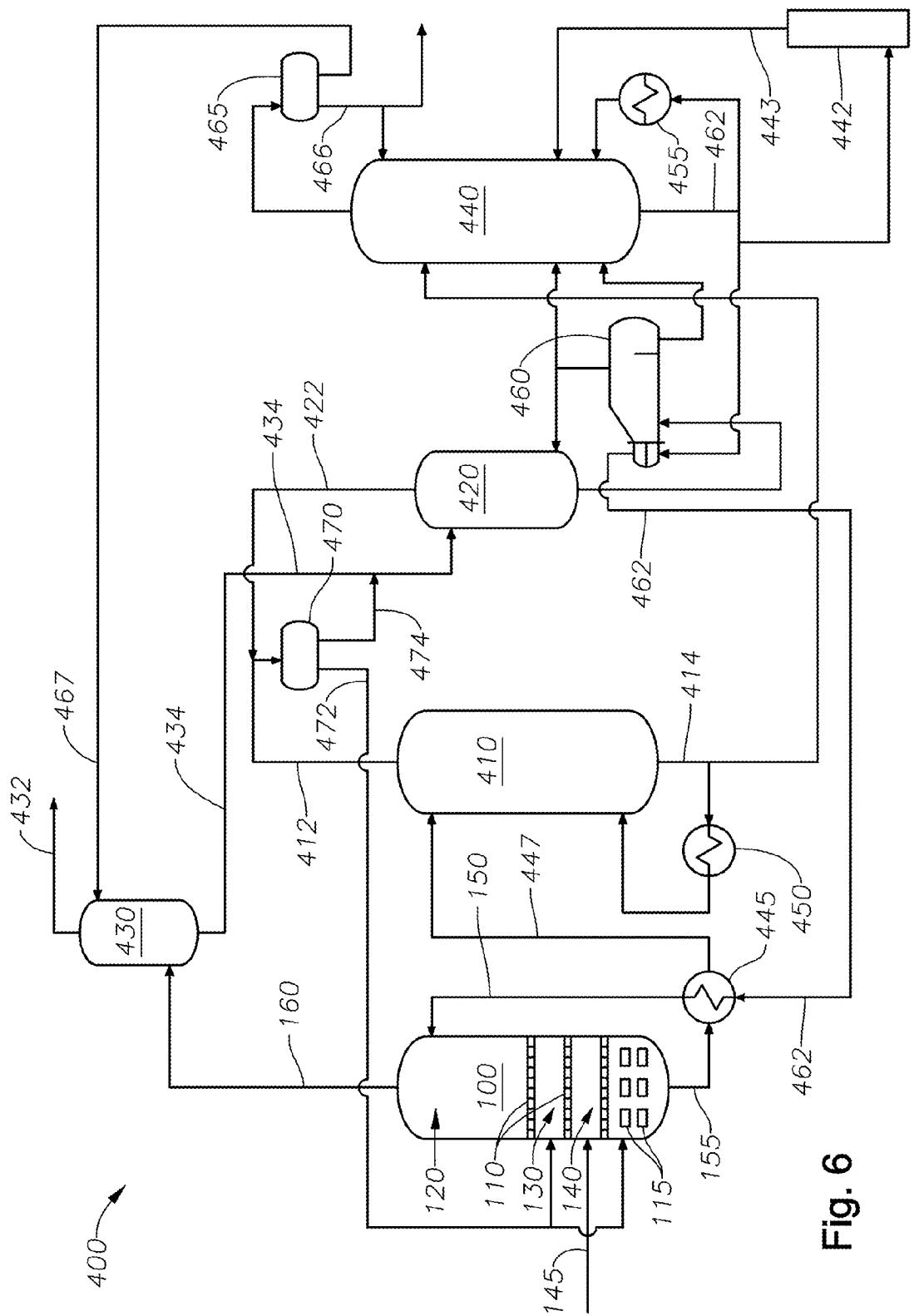
FIG. 6 depicts a schematic view of an illustrative system for separating a hydrocarbon, according to one or more embodiments described.

FIG. 6 depicts a schematic view of an illustrative system 400 for separating a hydrocarbon, according to one or more embodiments described. In addition to one or more extractors 100 described above, the system 400 can further include one or more strippers 410, water strippers 420, water wash columns 430, and recovery columns 440. In one or more embodiments, the system 400 can further include one or more heat exchangers (three are shown 445, 450, 455), one or more steam generators 460, and one or more water/hydrocarbon separators (two are shown 465, 470).

Within the extractor 100, a hydrocarbon mixture via line 145 (entering the extractor 100 at one or more locations) and a solvent via line 150 can be contacted or otherwise mixed with one another. The solvent extracts or otherwise separates at least a portion of the aromatic hydrocarbons from the multi-component hydrocarbon introduced via line 145 to provide a solvent enriched in aromatic hydrocarbons ("rich solvent") via line 155 and a raffinate having a reduced content of aromatic hydrocarbons via line 160.

The solvent can include any suitable material suitable for separating aromatic compounds from non-aromatic compounds. Illustrative solvents can include, but are not limited to tetraethylene glycol, triethylene glycol, diethylene glycol, ethylene glycol, methoxy triglycol ether, diglycolamine, dipropylene glycol, N-formyl morpholine, N-methyl pyrrolidone, 2,3,4,5-tetrahydrothiophene-1,1-dioxide ("sulfolane"), 3-methylsulfolane and dimethyl sulfoxide, tetramethylene sulfone, alone and/or in admixtures with water, and/or in combination with each other and/or water. In one or more embodiments, the solvent can have a pH ranging from a low of about 5, about 5.5, or about 6 to a high of about 8, about 8.5, or about 9. For example, the pH of the solvent in line 150 can range from about 5 to about 9, or about 5.5 to about 8, or about 6 to about 7.

In one or more embodiments, the hydrocarbon feed via line 145 can be any hydrocarbon or mixture of hydrocarbons having a carbon number in the $C_5$-$C_{10}$ range. In one or more embodiments, the hydrocarbon feed can be or include a mixture of aromatics and non-aromatics. Typical, aromatics can include one or more $C_6$-$C_9$ aromatic hydrocarbons, including benzene, toluene, and/or xylene. In one or more embodiments, the hydrocarbon feed can be or include a product stream from catalytically reformed naphthas in which a $C_9$ cut or extract of the reformate is enriched in $C_9$ alkylbenzenes. A typical composition of such $C_9$ cut can contain about 2.5% mol $C_8$, 87.5% mol $C_9$ and 10% mol $C_{10}$ aromatics. In one or more embodiments, the hydrocarbon feed can be or include $C_6$-$C_9$ aromatic hydrocarbons derived from gasoline producing processes such as the conversion of methanol to gasoline, as described in U.S. Pat. Nos. 3,931,349, 3,969,426, 3,899, 544, 3,894,104, 3,904,916 and 3,894,102, and/or the conversion of synthesis gas to gasoline as described in U.S. Pat. Nos. 4,096,163, 4,279,830, 4,304,871 and 3,254,023. In one or more embodiments, the hydrocarbon feed can be or include $C_6$-$C_9$ mixed aromatic hydrocarbons such as those derived from petroleum refinery sources, pyrolysis of coal to produce coke, tar sands, etc. In one or more embodiments, the hydrocarbon feed can be or include an alkylaromatic stream from a transalkylation, isomerization, and/or disproportionation operation.

In one or more embodiments, the volumetric solvent to hydrocarbon feed (S:H) ratio can range from about 1:1, to about 5:1, or from about 1:1 to about 3:1, or from about 1:1 to about 2:1. In at least one specific embodiment, the S:H ratio can be about 1.5:1. In one or more embodiments, the solvent in line 150 can be introduced to the extractor 100 at a temperature ranging from a low of about 40° C., about 50° C., or about 60° C. to a high of about 80° C., about 95° C., or about 100° C. For example, the temperature of the solvent in line 150 can range from about 60° C. to about 85° C.

In one or more embodiments, the extractor 100 can be operated at a pressure ranging from a low of about 225 kPa-g, about 250 kPa-g, or about 275 kPa-g to a high of about 400 kPa-g, about 450 kPa-g, or about 500 kPa-g. The extractor 100 can be operated at a temperature ranging from about 40° C., about 50° C., or about 60° C. to a high of about 70° C., about 85° C., or about 100° C. In at least one specific embodiment, the extractor 100 is operated at a temperate of from about 50° C. to about 70° C.

The rich solvent in line 155 can have a hydrocarbon concentration ranging from a low of about 10% wt, about 15% wt, or about 20% wt to a high of about 30% wt, about 35% wt, or about 49% wt, with the balance being the solvent. Of the hydrocarbons in the rich solvent in line 155, the aromatics can be about 50% wt, about 60% wt, about 70% wt, about 80% wt, or about 90% wt, with the balance being non-aromatic hydrocarbons. In one or more embodiments, the solvent concentration in the rich solvent in line 155 can range from a low of about 51% wt, about 65% wt, or about 70% to a high of about 80% wt, about 85% wt, or about 90% wt.

The rich solvent via line 155 can be introduced to the heat exchanger 445 to transfer heat from the lean solvent introduced via line 462 to provide a heated rich solvent via line 447 and a cooled lean solvent via line 150. The heated rich solvent via line 447 can be introduced to the stripper 410 to provide a less-aromatic rich hydrocarbon via line 412 and a solvent further enriched in aromatic hydrocarbons via line 414.

The raffinate in line 160 can have a non-aromatic hydrocarbon concentration ranging from a low of about 80% wt, about 85% wt, or about 90% wt to a high of about 95% wt, about 97% wt, about 98% wt, or more. In one or more embodiments, the raffinate in line 160 can have an aromatic hydrocarbon concentration ranging from a low of about 0.5% wt, about 1% wt, or about 3% wt to a high of about 5% wt, about 10% wt, or about 20% wt. In one or more embodiments, the raffinate in line 160 can have a solvent concentration ranging from a low of about 0.1% wt, about 0.25% wt, or about 0.5% wt to a high of about 0.75% wt, about 1% wt, or about 2% wt.

The raffinate in line 160 can be introduced to the raffinate wash column 430 to provide a raffinate product lean in solvent (sulfolane) via line 432 and a recovered water/solvent stream via line 434. The raffinate wash column 430 can separate at least a portion of the solvent in the raffinate to provide a raffinate product via line 432 containing less solvent than the raffinate in line 160. The recovered water/solvent in line 434 can contain aromatics/non-aromatics separated in/entrained from the raffinate wash column 430 from the raffinate introduced via line 160. The recovered water/solvent in line 434 can be introduced to the water stripper 420 to provide a water-lean, hydrocarbon-rich stream via line 422. The non-aromatic rich raffinate via line 432 can be further processed or sent to storage.

The water-lean, hydrocarbon-rich stream in line 422 can be introduced to the water/hydrocarbon separator 470 to provide a recycle hydrocarbon via line 472 and a recovered water stream via line 474. In one or more embodiments, the recycle hydrocarbons via line 472 can be introduced to the first section 120, and/or the second section 130, and/or the third section 140 of the extractor 100 for additional processing. In one or more embodiments, the recycle hydrocarbon via line 472 can be mixed with the feed line 145.

Within the recovery column 440, the bottoms from the stripper 410 is contacted with steam to recover the aromatics. The aromatic compounds are removed from the top of the recovery column 440 and the bottoms stream (lean solvent) 462 is recycled back to the extractor 100 and/or regenerated in the solvent regenerator 442 and returned to the recovery column 440 via line 443. The overhead from the recovery column 440 is introduced to the water/hydrocarbon separator 465 to separate water from the product aromatics. At least a portion of the recovered aromatics can be recycled to the recovery column 440 as reflux via line 466. The recovered water can be sent to the water wash column 430 via line 467.

Other embodiments can include:

Embodiment A: An apparatus for liquid-liquid extraction, comprising: a housing having a first section, second section, and third section; one or more sieve trays disposed in the first section; one or more gratings disposed in the second section; and a hydrocarbon feed inlet disposed adjacent the second section, wherein: each grating has a plurality of openings formed therethrough, the openings having at least three sides: the first section is disposed at a first end of the second section, and the third section is disposed at a second end of the second section.

Embodiment B: The apparatus of embodiment A, wherein the grating is at least partially coated with a non-polar material.

Embodiment C: The apparatus of embodiment A-B, wherein the grating has one or more strips of non-polar materials disposed through at least one opening.

Embodiment D: The apparatus according to any of embodiment A to C, wherein each opening of the grating is rectangular, square, hexagonal, or triangular.

Embodiment E: The apparatus according to any of embodiment A to D, wherein each opening is parallel to an axial centerline of the housing.

Embodiment F: The apparatus according to any of embodiment A to E, wherein each opening is angled relative to a longitudinal axis of the housing.

Embodiment G: The apparatus according to any of embodiment A to F, wherein each opening is pitched at an angle of about 10° to 40° relative to the longitudinal axis of the housing.

Embodiment H: The apparatus according to any of embodiment A to G, wherein each grating has at least 90% open area.

Embodiment I: The apparatus according to any of embodiment A to H, wherein the housing is vertically disposed and at least one grating is located above the hydrocarbon feed inlet, and at least one grating is located beneath the hydrocarbon feed inlet.

Embodiment J: An apparatus for liquid-liquid extraction, comprising: a housing having a first section, second section, and third section; one or more sieve trays disposed in the first section; one or more gratings disposed in the second section; and one or more wire mesh screens disposed in the third section, wherein: each grating comprises a plurality of openings formed therethrough; the second section is in fluid communication with a hydrocarbon feed inlet to the housing; the first section is disposed at a first end of the second section; and the third section is disposed at a second end of the second section.

Embodiment K: The apparatus of embodiment J, wherein the grating is at least partially coated with a non-polar material.

Embodiment L: The apparatus of embodiment J or K, wherein the grating has one or more strips of non-polar materials disposed through at least one opening.

Embodiment M: The apparatus according to any of embodiment J to L, wherein each opening of the grating is rectangular, square, hexagonal, or triangular.

Embodiment N: The apparatus according to any of embodiment J to M, wherein each opening is parallel to an axial centerline of the housing.

Embodiment O: The apparatus according to any of embodiment J to N, wherein each opening is angled relative to a longitudinal axis of the housing.

Embodiment P: The apparatus according to any of embodiment J to O, wherein each opening is pitched at an angle of about 10° to 40° relative to the longitudinal axis of the housing.

Embodiment Q: The apparatus according to any of embodiment J to P, wherein each grating has at least 90% open area.

Embodiment R: The apparatus according to any of embodiment J to Q, wherein the wire mesh screen comprises a plurality of inter-twined strips of wire.

Embodiment S: The apparatus according to any of embodiment J to R, wherein the wire mesh screen is coated with Teflon™, epoxide resin, or other non-polar coating.

Embodiment T: The apparatus according to any of embodiment J to S, wherein the wire mesh screen comprises at least one strip of wire that is at least partially coated with a polar material inter-twined with at least one strip of wire that is at least partially coated with a non-polar material.

Embodiment U: The apparatus according to any of embodiment J to T, wherein the housing is vertically disposed and at least one grating is located above the hydrocarbon feed inlet, and at least one grating is located beneath the hydrocarbon feed inlet.

Embodiment V: A method for separating aromatic compounds from a hydrocarbon mixture, comprising: feeding one or more solvents and a hydrocarbon mixture comprising one or more aromatic compounds and one or more non-aromatic compounds to an extractor, comprising: a housing having a first section, second section, and third section; one or more sieve trays disposed in the first section; one or more gratings disposed in the second section; and one or more packing materials disposed in the third section, wherein: each grating comprises a plurality of openings having at least three sides formed therethrough; the second section is in fluid communication with a hydrocarbon feed inlet to the housing; the first section is disposed at a first end of the second section; and the third section is disposed at a second end of the second section; recovering a raffinate comprising a majority of the non-aromatics from the first section; and recovering a rich solvent comprising a majority of the aromatics from the third section.

Embodiment W: The method of embodiment V, further comprising stripping the aromatics from the rich solvent and recycling the recovered solvent to the first section of the housing.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An apparatus for liquid-liquid extraction, comprising:
    a housing having a first section, second section, and third section;
    plural sieve trays disposed in the first section without gratings;
    plural gratings disposed in the second section without trays; and
    a hydrocarbon feed inlet disposed adjacent the second section, wherein:
        each grating has a plurality of openings formed therethrough, the openings having at least three sides;
        the first section is disposed at a first end of the second section;
        the third section disposed at a second end of the second section and having plural demister disposed therein; and
    wherein said gratings are at least partially coated with a non-polar material.

2. The apparatus of claim 1, wherein said non-polar material is selected from fluoropolymers and epoxy-containing polymers.

3. The apparatus of claim 1, wherein at least one of said demister pads include CWMS.

* * * * *